United States Patent [19]

Bullard et al.

[11] 4,303,710
[45] Dec. 1, 1981

[54] COEXTRUDED MULTI-LAYER POLYETHYLENE FILM AND BAG CONSTRUCTION

[75] Inventors: Edward M. Bullard, Rochester; Gregory M. Smith, Palmyra, both of N.Y.

[73] Assignee: Mobil Oil Corporation, New York, N.Y.

[21] Appl. No.: 126,932

[22] Filed: Mar. 3, 1980

Related U.S. Application Data

[63] Continuation of Ser. No. 934,235, Aug. 16, 1978, abandoned.

[51] Int. Cl.³ .................. B65D 11/00; B32B 7/02; B32B 27/08
[52] U.S. Cl. .................. 428/35; 156/229; 229/53; 229/55; 427/230; 428/212; 428/516; 428/517; 525/240
[58] Field of Search .......... 428/35, 516, 517, 218, 428/212; 156/229; 229/55, 53; 525/240; 427/230

[56] References Cited

U.S. PATENT DOCUMENTS

| | | | |
|---|---|---|---|
| 3,176,052 | 3/1965 | Peticolas | 525/240 |
| 3,281,501 | 10/1966 | Coats et al. | 525/240 |
| 3,294,577 | 12/1966 | Mayer | 427/230 X |
| 3,361,607 | 1/1968 | Bruno | 156/82 |
| 3,423,010 | 1/1969 | Corbett | 229/55 X |
| 3,508,944 | 4/1970 | Henderson et al. | 428/516 X |
| 3,509,116 | 4/1970 | Coteet al. | 526/98 X |
| 3,682,767 | 8/1972 | Britton et al. | 428/516 X |
| 3,926,706 | 12/1975 | Reifenhauser et al. | 156/229 |
| 4,022,646 | 5/1977 | Casey | 428/516 X |
| 4,196,240 | 4/1980 | Lustig et al. | 428/516 X |
| 4,197,150 | 4/1980 | Breidt et al. | 156/229 |
| 4,198,256 | 4/1980 | Andrews et al. | 156/229 |
| 4,205,021 | 5/1980 | Morita et al. | 525/240 |

*Primary Examiner*—Thomas J. Herbert, Jr.
*Attorney, Agent, or Firm*—Charles A. Huggett; James F. Powers, Jr.; James P. O'Sullivan, Sr.

[57] ABSTRACT

Laminar thermoplastic film constructions comprising a layer of low density polyethylene bonded to a layer of a dissimilar polymer blend comprising high density polyethylene and polyethylene copolymers. In particular such copolymers comprise polyethylene copolymerized with another alpha olefin containing from about 3 up to about 15 carbon atoms. Such copolymers are also characterized by being linear, low density polymers having densities which are below about 0.94 grams/cc.

13 Claims, 1 Drawing Figure

COEXTRUDED MULTI-LAYER POLYETHYLENE FILM AND BAG CONSTRUCTION

CROSS-REFERENCE TO RELATED APPLICATION

This application is a continuation of Application Ser. No. 934,235 filed Aug. 16, 1978, now abandoned.

DESCRIPTION OF THE PRIOR ART

Thermoplastic bags, and in particular polyethylene bags, have in recent years gained prominence in the packaging of a wide variety of goods such as dry goods, comestibles and the like. Most recently, polyethylene bags have emerged as the preferred packaging material for refuse materials and, in fact, many communities across the country have mandated that refuse be packaged and contained in such a manner. The advantages offered are obvious and include a hygenic means for the containment of garbage and waste materials; the bag provides some protection of the contents from insects, ruminants and other animals which would normally be attracted by the bag contents. Such bags are conventionly employed as disposable liners for trash cans whereby when the trash containers have been filled to capacity, the bag mouth is gathered and twisted closed and raised out of the container, leaving the interior of the container free from contamination and ready to receive another bag liner. The twisted bag mouth may be secured in a conventional manner employing wire-twistems or similar fasteners and subsequently the closed, loaded bag is disposed of. Alternatively, such bags may be employed in an unsupported condition as receptables. Prior art polyethylene branched low density homopolymer bags however lack stiffness and when articles are loaded into such bags difficulties are encountered in keeping the bag mouth open, requiring excessive digital manipulation.

Another of the most common drawbacks in the employment of polyethylene bags in waste disposal is their tendency to rupture under load stresses and, also, their fairly low puncture resistance. When a loaded bag is punctured, by an internal or external element, it is characteristic of the polyethylene film to zipper, i.e., the puncture tear rapidly propagates across or down the bag wall.

Numerous attempts have been made in the past to remedy the aforenoted deficiencies, the most obvious being to increase the film gauge, i.e., make the bag walls thicker and therefore stronger. However, substantial gauge increases are necessary to achieve substantial bag strengthening, on the order of 50% to 150%, and the product costs are increased in direct proportion to the increased amount of resin employed in each bag. Attempts to replace the relatively low cost polyethylene with other resins which exhibit improved strength characteristics have been largely unsuccessful for reasons including the unfavorable economics associated with the more costly resin substitutes.

SUMMARY OF THE INVENTION

In accordance with the present invention it has been found that thermoplastic film structures which contain a predominant amount of relatively low cost resinous materials commonly used in the prior art fabrication of bags such as, for example, general purpose, low density polyethylene branched homopolymer resin may be fabricated into articles such as bags which have improved stiffness, i.e., modulus, and strength characteristics over prior art polyethylene bags. In general it has been found that a multi-layer structure comprising at least one layer of low density, general purpose polyethylene resin having a thickness on the order of from about 50% to 90% and preferably from about 65% up to about 85% of the overall laminate thickness may be bonded to a second layer, the second layer contributing the balance of the overall thickness of a blend of resins. For example, the second layer may be constituted by a relatively thin layer of a resinous blend which comprises a high density polyethylene homopolymer resin and a linear low density polyethylene copolymer, which may be a copolymer of ethylene and another alpha olefin having from about three up to fifteen carbon atoms and a density of below about 0.94 grams per c.c. The preferred alpha-olefin comonomers comprise at least one $C_4$ to $C_8$ olefin. Minor amounts of a colorant masterbatch material, on the order of less than about 5% by weight, such as a blend of low density polyethylene and an inorganic pigment may also be used. It has been found that when structures such as bags are fabricated from such laminar film materials, the branched low density polyethylene layer preferably constituting the interior bag surface, such bag structures offer improved strength characteristics as contrasted to the aforedescribed prior art polyethylene bag structures. Additionally, such strength characteristics are not achieved by sacrificing material economics as hereinabove discussed since the laminar bag structure of the present invention contains a predominant amount, i.e., up to about 85% of the overall laminar thickness, of low cost general purpose branched low density polyethylene resin.

BRIEF DESCRIPTION OF THE DRAWINGS

The FIG. 1 is a schematic side elevation, in cross section, of one form of extrusion apparatus which may be employed for the production of the laminar films of the present invention, with certain segments enlarged for clarity.

DESCRIPTION OF SPECIFIC EMBODIMENTS

Figure 1:
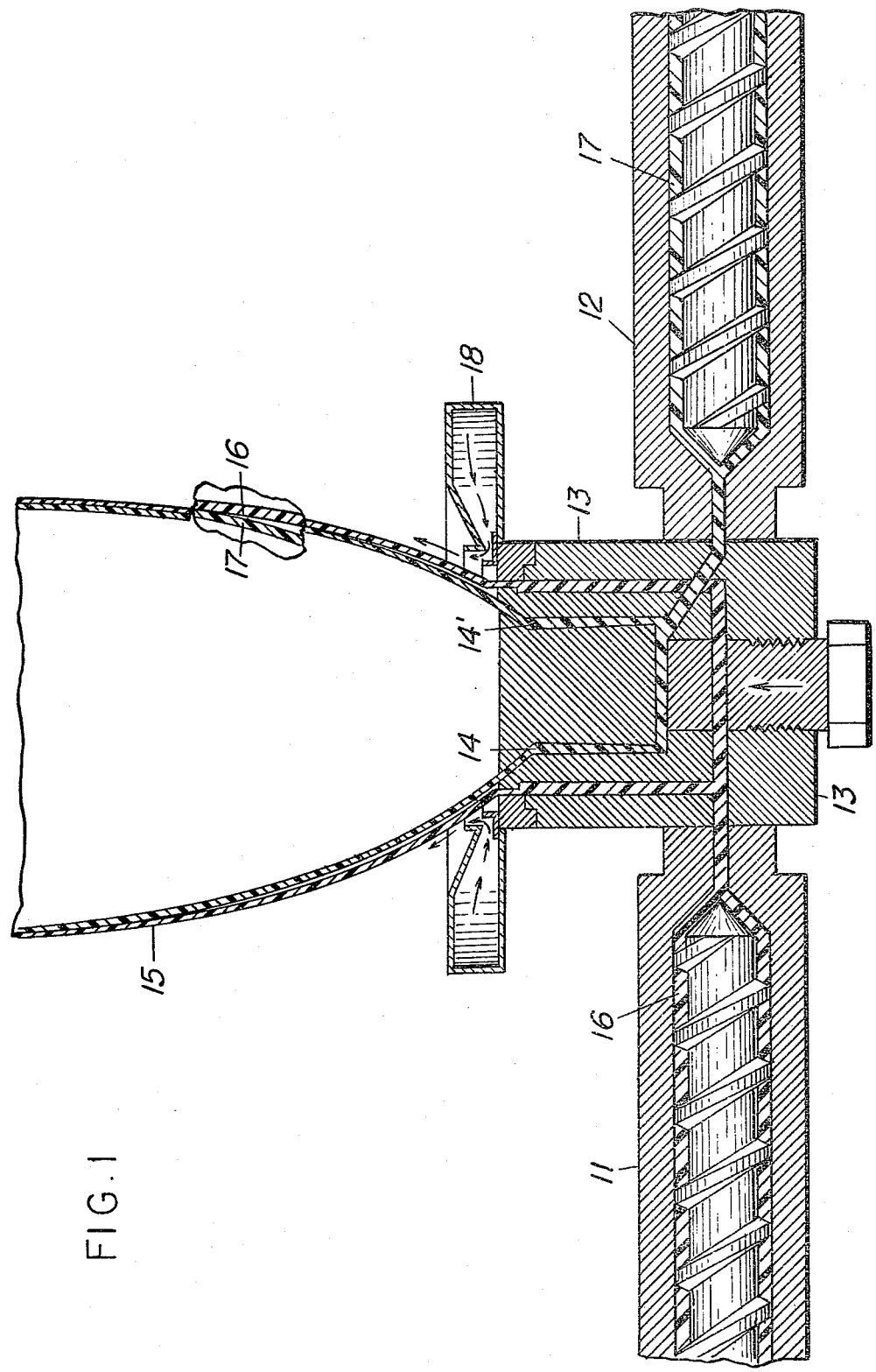

Numerous techniques have been described in the prior art for the formation of multilayer laminar thermoplastic film constructions including preforming a first film and subsequently melt extruding another film onto its surface whereby a two layer laminate is formed. Other techniques which have been developed in more recent years include a technique which is referred to as coextrusion, a process whereby molten or semimolten layers of different polymer melts are brought into contact and subsequently cooled. Examples of such coextrusion techniques are described in U.S. Pat. Nos. 3,508,944 and 3,423,010. Although any of the aforedescribed techniques may be suitable in formation of the laminar structures of the present invention a particularly preferred technique is to produce the present laminates by extrusion of separate polymer melts from tubular die orifices which are concentric causing the separate molten or semi-molten streams to be extruded coaxially and then merged together outside of the die orifices whereby upon subsequent cooling a tubular laminate is produced.

In producing the multi-layer film of the present invention, intended for bag structures in one particular application, it has been found that certain particularly desirable physical characteristics should be exhibited by the individual lamina. For example in bag constructions the outer layer, which may comprise from about 10% up to 50% of the overall laminate thickness, must be preferably stiff, i.e., have a relatively high tensile modulus; it must be tough, i.e., resistant to impact forces; it should exhibit good elongation under stress; and, finally, have a high degree of tear resistance particularly in the transverse direction of the layer, i.e, the direction which is transverse to the extrusion direction. The physical characteristics which are particularly desirable in the thicker interior laminar bag layer include ease of heat sealing over wide ranges of temperature and pressure; and a high degree of tear resistance particularly in the layer's machine direction.

The degree of orientation in each of the respective laminar layers is an important factor with respect to the overall physical properties of the multilayer structure. It has been found that two types of orientation of the polymer crystallites occur in blown film extrusion by the trapped air method. The first type occurs by flow through the die lips and this orientation tends to align the crystallites formed upon cooling in the direction of flow (MD). In a linear polymer with long, straight chains, the crystallites are oriented in the machine direction. With more branching of the chain as in ordinary low density branched polyethylene, the crystallites tend to be in a somewhat more random orientation. The orientation of high density polyethylene, since it is linear and more crystalline, thus is quite strong compared to branched low density polyethylene. From this die effect alone, the net result is a highly oriented film in the machine direction (MD) with little transverse direction (TD) orientation. In the homopolymer progression from ordinary low density polyethylene to high density polyethylene, as the density increases and polymer branching decreases, the material is more subject to orientation. High density polyethylene is highly oriented and thus susceptability to tearing in the machine direction (MD) is very high.

It has been found that the second type of orientation in the blown film process is the blow-up ratio (BUR) effect. Since this stretching of the film expands the bubble to larger diameters, the stress on polymer crystallites is multi-directional in nature and thus helps counteract the MD orientation associated with the die effects. As BUR increases, TD orientation effects increase at some drop in MD properties. Improved tear resistance thus can be achieved in the normally weak TD direction.

Low density polyethylene normally is run in the range of 1.5–3.0:1 blow-up ratio (circumference of the bubble: circumference of the annula die) in an attempt to balance the properties between machine direction (MD) and transverse direction. In contrast high density polyethylene orients strongly in the machine direction due to the die effect, giving very poor TD properties at low density polyethylene type blow-up ratios. Economics and ease of handling the molten polymer strongly discourage such large blow-up ratios but tear is a key property in the bag type product. The present invention permits film to run at low density polyethylene rates and BUR conditions (i.e. 1.5 to 3:1 ratio) with the additional stiffness and strength of the high density polyethylene-ethylene and α-olefin blend in the outer layer.

There is illustrated in FIG. 1 one form of extrusion apparatus which may be employed to produce the laminar films of the present invention. As shown two thermoplastic extruders 11 and 12 feed dissimilar molten thermoplastic resins to common die member 13. Tubular extrusion die 13 has two concentric annular passages to separately accommodate and shape the individual resinous streams until they exist from concentric die orifices 14 and 14'. Shortly after emerging from orifices 14 and 14' the concentric, coaxial, molten or semi-molten tubes merge and become bonded together to form a two layered laminar tube 15. Air is provided (by conventional means not shown) to inflate and support tube 15 until tube 15 is collapsed downstream from die 13 by conventional counter-rotating collapsing rollers (not shown), i.e., a conventional entrapped air-bubble tubular extrusion process. The collapsed laminar tubing is subsequently passed to a wind-up station (not shown) or on to further processing, e.g., a bag making operation.

In practice, pelletized resinous materials to be fed to the extrusion system illustrated in FIG. 1 is air-veyed by a vacuum unloader from a supply source and fed to separate feeder tanks which are mounted above the individual extruders 11 and 12 illustrated in FIG. 1. Each of the resinous components in the blend compositions which are fed to extruder 11 (i.e., the extruder which supplies a molten resinous blend to die 13 to form outer layer 16) are volumentrically measured and dropped into a mixer located above extruder 11, the order of addition is not critical. The mixer is actuated at 120 RPM for approximately 15 seconds and then the premixed blend is fed to the extruder feed zone (not shown). For the primary extruder (i.e., extruder 12 which is employed to form the inner layer 17) a resin consisting essentially of branched low density polyethylene is used as a feed material.

The primary extruder 12 which was employed in the following example comprised a 6 inch diameter screw which was driven by a 250 HP motor. The screw had an L/D ratio of 28:1 The extruder barrel was a standard design and equipped with external jackets employed for the circulation of temperature control fluids therein and/or conventional electric resistance band heating elements positioned around the barrel.

The secondary extruder 11, i.e., that extruder which feeds molten resinous blend mixtures to die 13 to form outer layer 16 of the laminar structure, had a 4½ inch screw diameter and an L/D ratio of 24:1. The extruder barrel for extruder 12, was likewise equipped with external jackets for circulation therein of temperature control fluids and/or electrical resistance band heaters spaced along the length of the barrel to control the temperatures of the molten polymer inside the barrel.

Die 13, as shown in FIG. 1, is a coextrusion die with the primary extruder 12 feeding material which will eventually constitute layer 17 and secondary extruder 11 feeding material to die 13 which will eventually constitute outer layer 16. The annular die lips have approximately a 0.040 inch annular gap which form orifices 14 and 14' with a ½ to 2 inch length angled lip section in the die so that the individual concentric tubes are separated as they exit from die 13 by approximately 1/32 inch. As a result of the separation, the film layers are joined above the die as illustrated in FIG. 1 to form laminar tube 15.

Upon exit from die 13 the extruded concentric tubes 16 and 17 are oriented by internal air pressure trapped within the tube between the die 13 and the film collapsing nips (not shown) which inflates the tube to between 2 and 2.5 times the circumference of the die orifice.

This is essentially a conventional entrapped air bubble extrusion technique.

While the internally trapped air is stretching the film, a high velocity air stream supplied by air ring 18 as shown in FIG. 1, impinges in a generally vertical direction on the extruded tube to cool the molten polymer. The combination of internal air expansion and high velocity impingement of air from air ring 18 causes the layers to contract while still in the molten state and thereby forming a strong interfacial bond as the contacting layers cool and solidify.

Prior to passage of tube 12 to the nip rollers the formed film tube is conventionally collapsed by a frame of horizontally wooden slats located in an inverted V shape with the angle between the legs of the V approximately 30° to 35°. This V frame gradually flattens the film tube until, at the apex of the V, the tube is completely collapsed by the nip rollers which may consist of a rubber roll and a steel driven roller. The nip rollers function to draw the tube from the extrusion die 13 and also effect an air seal for the entrapped air bubble in the tube. Subsequent to passing the flattened tube through the nip rollers, the film is either wound into rolls or passed through bag making machinery or the like to form a finished product.

As hereinabove discussed, the outer layer of the laminar film structures of the present invention preferably comprise a blend of thermoplastic resins and in particular blends of high density polyethylene together with a linear low density polyethylene-alpha olefin copolymer. While these copolymers may contain alpha-olefins having 3 to 15 carbon atoms, the preferred copolymers include polyethylene copolymerized with another alpha olefin including $C_4$ to $C_8$ alpha-olefins such as octene-1, butene-1, hexene-1 and 4-methylpentene-1. The preferred concentration by weight of the alpha olefin which is copolymerized with polyethylene is from about 2.0% up to about 10% by weight. In the following specific embodiments the linear low density copolymer of polyethylene with about 4.8% by weight of octene copolymerized therewith. It has been found that when such a blend comprises the exterior laminar tube layer, the resultant laminates exhibit greatly improved modulus and tear resistance.

In the following Table I there is presented a listing of pertinent resin physical properties of the various polyolefin materials which were employed in the succeeding examples.

TABLE I

Low Density Polyethylene Resin (For Inner Layer Polyethylene Component

| Property | Value | ASTM Test Method |
|---|---|---|
| Melt Index, g/10 min | 2.25 | D-1238-65T |
| Density, g/cc | .921 | D-1505-68 |
| Tensile at Yield (20"/min) psi | 1331 | D-638-68 |
| Tensile at Break (20"/min) psi | 1688 | D-638-68 |
| Elongation at Break, % | 603 | D-638-68 |
| Elastic Modulus, psi | 24635 | D-638-68 |
| Stiffness in Flexure, psi | 800 | D-747-63 |
| Hardness, Shore D | D44 | D-2240-68 |
| Vicat Softening Point, °F. | 217 | D-1525-65T |
| Brittleness Temperature, °F. | below −105 | D-746-64T |

TABLE I-continued

Physical Properties - Linear Low Density Polyethylene - Octene-1 Copolymer Resin

| Property | Value | ASTM Test Method |
|---|---|---|
| Melt Index | 2.0 | D-1238 |
| Density | 0.926 | D-1505 |
| Molecular Weight | 89,000 | — |
| % by Weight Octene-1 | 4.8 | — |

High Density Polyethylene Resin

| Property | Value | ASTM Test Method |
|---|---|---|
| Melt Index, g/10 min. | 0.35 | D-1238 |
| Density, g/cc | 0.963 | D-1505 |
| Tensile Yield | | D-638 |
| lbf/in$^2$ | 4100 | |
| kgf/cm$^2$ | 288 | |
| Elongation, % | 800 | D-638 |
| Flexural Modulus | | D-790 |
| lbf/in$^2$ | 205,000 | |
| kgf/cm$^2$ | 14,400 | |
| Hardness, Shore D | 70 | D-1706 |
| Izod Impact, ft lbf/in of notch | 6.9 | D-256 |
| Tensile Impact | | D-1822 |
| ft lbf/in$^2$ | 60 | |
| cm kgf/cm$^2$ | 128 | |
| Brittleness Temperature | <−70 | D-746 |
| Vicat Softening Point | | D-1525 |

The details and manner of producing the laminar tubular structures of the present invention will be apparent from the following specific examples, it being understood, however, that they are merely illustrative embodiments of the invention and that the scope of the invention is not restricted thereto.

In the subsequent examples the apparatus which was actually used to form the multi-wall thermoplastic tubing corresponded essentially to that shown in FIG. 1 of the drawing. Also, the resinous material employed in the following examples had the physical properties as outlined in preceding Table I.

EXAMPLE 1 (Comparative Prior Art Film)

A dual wall tubular thermoplastic film was coextruded with an inner layer of branched low density polyethylene homopolymer and an outer layer of a blend of crystalline high density polyethylene homopolymer with ethylene-vinylacetate (EVA) copolymer (18% vinyl acetate by weight), and ordinary fractional melt branched low density polyethylene. The homopolymeric inner layer consists of about 96 parts by weight of branched low density polyethylene and 4 parts of black master batch colorant. The outer layer consists of a melt blend mixture of about 35 wt% crystalline high density polyethylene homopolymer, 35 wt% EVA copolymer, 25 wt% branched low density polyethylene and 5 wt% of redwood master batch colorant. The master batch colorants are prepared from about 50 wt% inorganic pigment and 50 wt% ordinary low density polyethylene.

The inner and outer layers are melt extruded concurrently from extruders 12 and 11, respectively, forming a multilayer film having an average thickness of about 1.5 mils. The respective molten layers assumed a tubular configuration as they flowed through die 13. The molten tubes exit from die 13 as concentric tubes through orifices 14 and 14′ whereupon they subsequently merged together to form the laminar tube 15 as shown in FIG. 1. The extruder processing conditions including pressures, temperatures and die orifice dimensions employed for this, and the following example, are set forth in subsequent Table II which also includes data on the physical properties of the multi-wall extruded film produced. No separation of the two layers occurred when the resultant laminar film was repeatedly flexed. The branched low density polyethylene layer of the laminar film constituted approximately 78% of the overall thickness of the laminate.

EXAMPLE 2

The procedure of Example 1 was followed, however, in this case the outer layer of the tubular film construction comprised a major amount of linear low density copolymer. The structure was further modified in the present example in that the outer laminar layer comprised about 75% by weight of a linear, low density ethylene-octene-1 copolymer containing about 4.8% by weight of octene-1; 20% by weight of high density polyethylene and about 5% by weight of a master batch comprising 50% by weight of inorganic pigment and about 50% of weight of low density polyethylene as a carrier.

EXAMPLE 3

The tubular blend comprising the outer laminar layer was identical with that defined in preceding Example 2, however, the total thickness of the outer laminar layer comprised about 26% of the overall laminate thickness.

EXAMPLE 4

The tubular laminar construction was prepared in accordance with the procedure defined in Example 1, however, in this case the external tubular layer comprised 22% of the overall laminate thickness. Additionally, the outer laminar layer blend in this example comprised a blend of about 60% by weight of the ethylene-octene-1 copolymer; 20% by weight of high density polyethylene; 5% by weight of the low density-inorganic pigment colorant; and about 15% by weight of ordinary branched low density polyethylene as hereinbefore defined.

EXAMPLE 5

A tubular laminar construction was prepared in accordance with the procedure set forth in Example 1, wherein the overall thickness of the outer laminar layer was approximately 22%. In this case, the resin blend comprising the outer layer of the tubular laminate comprised 65% by weight of ethylene-octene-1 copolymer; 30% by weight of high density polyethylene and 5% by weight of the pigmented master batch material.

The physical properties of the tubular laminates prepared in accordance with the preceding Examples are set forth in following Table 2. Table 3 sets forth the process conditions which were employed to produce the laminar structures as described in preceding Examples 1 through 5 inclusive.

TABLE 2

| Example | 1 | 2 | 3 | 4 | 5 |
|---|---|---|---|---|---|
| Outer Layer | | | | | |
| Percentage of Total bags | 22% | 22% | 26% | 22% | 22% |
| Ethylene - olefin (%) | — | 75 | 75 | 60 | 65 |
| HDPE (%) | 35 | 20 | 20 | 20 | 30 |
| Redwood Masterbatch (%) | 5 | 5 | 5 | 5 | 5 |
| LDPE (%) | 25 | — | — | 15 | — |

TABLE 2-continued

| Example | | | 1 | 2 | 3 | 4 | 5 |
|---|---|---|---|---|---|---|---|
| EVA (%) | | | 35 | — | — | — | — |
| Inner Layer | | | 78 | 78 | 74 | 78 | 78 |
| LDPE | | | 96 | 96 | 96 | 96 | 96 |
| Black Masterbatch (%) | | | 4 | 4 | 4 | 4 | 4 |
| Elmendorf Tear | MD | MD | 447 | 549 | 547 | 550 | 582 |
| (6 MS) | TD | TD | 222 | 176 | 202 | 199 | 210 |
| 1% Secant Moduls | | MD | 24.3 | 24.9 | 25.8 | 26.6 | 28.6 |
| (K PSI) | | TD | 31.7 | 30.7 | 29.9 | 33.7 | 35.0 |
| Tensile Yield | | MD | 1316 | 1418 | 1296 | 1406 | 1463 |
| (PSI) | | TD | 1433 | 1470 | 1414 | 1546 | 1604 |
| Tensile Ultimate | | MD | 3588 | 3104 | 3089 | 3328 | 3185 |
| (PSI) | | TD | 2146 | 2095 | 2089 | 2151 | 2232 |
| Tensile Toughness | | MD | 482 | 473 | 508 | 464 | 527 |
| Ft.-lb/in$^3$ | | TD | 736 | 727 | 702 | 744 | 783 |
| Tensile Elongation | | MD | 201 | 227 | 244 | 208 | 242 |
| (%) | | TD | 576 | 525 | 555 | 560 | 574 |
| Directional Spencer | | | 70 | 75 | 78 | 61 | 71 |
| Opacity (Light Transmission %) | | | 11.9 | 8.2 | 7.0 | 7.2 | 6.3 |

TABLE 3

| | |
|---|---|
| Extruder 12: (inner layer) | |
| Barrel Dia. (in.) | 6" |
| Screw RPM | 49 |
| Plastic Melt Temp., °F. | 396 |
| Plastic Melt Press. (psi) | 4600 |
| Extruder 11: (outer) | |
| Barrel Dia. (in.) | 4.5 |
| Screw RPM | 41 |
| Plastic Melt Temp., °F. | 500 |
| Plastic Melt Press. (psi) | 5400 |
| Die 13: | |
| Orifice Width (in.) outer | .040 |
| Orifice Width (in.) inner | .040 |
| Tubular Film: | |
| Layflat Width (in.) | 72 |
| Wall Thicknesses (mils) | |
| Inner Wall | 1.2 mil |
| Outer Wall | 0.3 mil |

As will be apparent from the foregoing Examples and Tables, it has been found that blend compositions comprising a linear low density copolymer of an ethylene-alpha-olefin such as octene-1 when blended together with an appropriate amount of a high density polyethylene resin provides excellent resistance to tear and high modulus properties. Moreover, such properties are either equivalent or superior to prior art blend mixtures such as those containing high density polyethylene and large amounts of ordinary low density polyethylene and/or ethylene-vinyl acetate (EVA) copolymer which have been employed in prior art constructions.

Although the present invention has been described which preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A laminar film structure comprising at least one layer of branched low density polyethylene resin and a second thinner layer comprising a resinous blend of a high density polyethylene and linear low density ethylene-alpha-olefin copolymer, wherein said blend contains a major amount of said copolymer said layer of low density polyethylene having a thickness on the order of from about 65% up to about 85% of the overall thickness of said laminate.

2. A laminar film structure in accordance with claim 1 wherein said second layer comprises from about 15 percent to about 35 percent of the total laminar film thickness.

3. A laminar film structure in accordance with claim 1 wherein said alpha-olefin comprises about 3 up to about 15 carbon atoms.

4. A laminar film structure in accordance with claim 1 wherein the concentration by weight of said alpha-olefin in said copolymer is from about 1.5 percent to about 10 percent.

5. A laminar film structure in accordance with claim 1 wherein said copolymer has a density below about 0.94 grams per c.c.

6. A thermoplastic bag structure having film walls comprising an inner layer and an outer layer coextruded therewith, said inner layer consisting essentially of branched low density polyethylene homopolymer and said outer layer comprising a resinous blend of a high density polyethylene homopolymer and linear low density ethylene-alpha-olefin copolymer, wherein said blend contains a major amount of said copolymer, said layer of low density polyethylene having a thickness on the order of from about 65% up to about 85% of the overall thickness of said laminate.

7. The thermoplastic bag structure of claim 6 wherein said copolymer has a density below about 0.94 grams per c.c., said alpha-olefin is present in the copolymer in a concentration by weight of about 1.5 percent to about 10 percent, and said alpha-olefin comprises about 3 to 15 carbon atoms.

8. The bag structure of claim 6 wherein said linear low density copolymer consists essentially of ethylene copolymerized with about 2 to 10% by weight of at least one alpha-olefin comprising butene-1, hexene-1, 4-methylpentene-1 or octene-1.

9. The bag structure of claim 6 wherein said copolymer consists essentially of ethylene copolymerized with about 4.8% octene-1 having a melt index of about 2, and density of about 0.926; and wherein said high density polyethylene has a melt index of about 0.35 and density of about 0.963.

10. A multi-layer thermoplastic film comprising coextruded layers of branched low density ethylene homopolymer and a blend of crystalline high density ethylene homopolymer with linear low density ethylene copolymerized with a minor about of alpha-olefin, and wherein a predominant amount of film thickness is the branched low density ethylene homopolymer layer.

11. The film of claim 10 wherein said coextruded layers comprise blown tubular film having a blow-up ratio of about 1.5 to 3:1.

12. The film of claim 10 wherein the blend comprises a major amount of copolymer containing 2% to 10% by weight of at least one $C_4$ to $C_8$ alpha-olefin and having a density of less than 0.94.

13. The film of claim 12 wherein said blend consists essentially of the high density ethylene homopolymer and at least about 65 weight % of linear low density copolymer of ethylene with butene-1, hexene-1, 4-methylpentene-1 or octene-1.

* * * * *